United States Patent Office 3,270,090
Patented August 30, 1966

3,270,090
METHOD FOR MAKING GRAFT COPOLYMERS OF POLYOLEFINS AND ACRYLIC AND METHACRYLIC ACID
Robert M. Nowak, Midland, Mich., assignor to The Dow Chemical Company, Midland, Mich., a corporation of Delaware
No Drawing. Filed Apr. 22, 1963, Ser. No. 274,807
8 Claims. (Cl. 260—877)

This invention concerns a method for making graft copolymers comprising polyolefins and acrylic acid and/or methacrylic acid. It relates more particularly to an improved method for making such graft copolymers.

It is known to prepare polymeric products by subjecting a mixture of a polymerizable monomeric olefinic compound and a linear polymer in the absence of oxygen to an agitation treatment sufficient to degrade the linear polymer and thereby yield a polymer in the molecular structure of which the olefinic compound forms a part.

It is known to prepare polymeric products comprising graft copolymers by, for example, polymerizing a monomer in the presence of, or in admixture with, a latex of an already formed polymer in an aqueous emulsion and in the presence or absence of an added polymerization catalyst.

It has now been discovered that graft copolymers of normally solid thermoplastic resinous homopolymers and copolymers of one or more aliphatic olefins containing from 2 to 3 carbon atoms in the molecule and copolymers containing a predominant amount of one or more of such aliphatic olefins chemically combined or interpolymerized in the copolymer molecules can readily be prepared by a procedure which consists essentially of first irradiating the polymer in finely divided form with high energy ionizing radiation, preferably in air or an oxygen-containing atmosphere, then malaxing the irradiated and heat-plastified normally solid thermoplastic olefin polymer at elevated heat-plastifying temperatures between 130° and 250° C., preferably 165°–200° C., while contacting the heat-softened or molten polymer with a minor proportion, i.e. 30 percent by weight or less of the total mixture, of acrylic acid, methacrylic acid or a mixture of said acids.

It is important that the malaxing, i.e. the kneading, milling, mixing, or stirring, of the irradiated heat-plastified or molten polymer in contact with the monomer, be carried out in such manner as to avoid appreciable breakdown or degrading of the polymer molecules such as by carrying out the malaxing in a plastic screw type extruder, or a Banbury mixer.

It has further been found that by malaxing the pre-irradiated and heat-softened or molten polymer with the monomeric acid, that there appears to be formed a large number of grafting sites along the polymer chains with the resultant formation of graft copolymers consisting predominantly of the substrate polymer having attached thereto a large number of grafted-on chains of the monomeric acid units of relatively short chain length.

The polymeric substrate to be employed in preparing the graft copolymers is preferably a homopolymer or copolymer of one or more aliphatic olefins containing from two to three carbon atoms in the molecule such as polyethylene, polypropylene or copolymers of ethylene and propylene. The polymer is irradiated in the form of a fine powder of particles of sizes not greater than 1000 microns, preferably between 1 and 500 microns. Advantageously, the polymer is free or substantially free from antioxidants or contains only a small amount, e.g. less than about 500 parts of antioxidant per million parts by weight of the polymer.

The monomers to be graft polymerized onto the polymeric substrate can be acrylic acid, methacrylic acid or mixtures of said acids in any and all portions. The monomeric acid is employed in amounts corresponding to from 1 to 100, preferably from about 5 to about 50 parts by weight per 100 parts by weight of the polymer starting material, and preferably contains a polymerization inhibitor such as tert.-butyl catechol, hydroquinone, or monomethyl ether of hydroquinone, in amounts of about 0.02 percent by weight to inhibit the formation of homopolymer, but an inhibitor is not required.

In practice, the irradiated polymer, e.g. polyethylene or polypropylene, is fed to a plastics extruder wherein it is pressed and heated to a flowable or molten condition at temperatures between 130° and 250° C., and above the crystalline melting point of the polymer, under pressure. The monomeric acrylic acid or methacrylic acid, or a mixture thereof, is fed under pressure into a mid-section of the barrel of the extruder and into contact with the heat-plastified or molten polymer. The resulting mixture is maintained molten or flowable and is blended under pressure into a homogeneous composition as it is forwarded by action of the screw in the barrel of the plastics extruder toward the discharge orifice or die. During contacting and blending of the monomeric acid with the heat-plastified polymer at the elevated temperatures, the initiating of a polymerization reaction and the formation of a graft copolymer occurs. The monomeric acid and the molten or heat-plastified polymer are maintained in contact with one another at the elevated temperatures for a time sufficient to polymerize all or substantially all of the monomers, then is extruded and cooled and cut or ground to a granular form. The irradiated polymer and the monomeric acid can be fed together to the extruder and maintained in contact with one another at the elevated reaction temperatures and under pressure until at least a predominant amount of the monomeric acid is polymerized, then is passed through a devolatilizing zone in the extruder, after which it is extruded, cooled and cut to a granular form.

The graft copolymers are useful for a variety of purposes. They can be molded by usual compression and injection molding operations or by extrusion methods to form useful articles such as boxes, cups, trays, or rods, bars, sheet or film material. The graft copolymers may contain from 1 to 30, preferably from about 5 to 20 percent by weight of the acrylic acid or methacrylic acid chemically combined with the polymeric substrate starting material. The graft copolymers possess good mechanical properties such as tensile strength, percent elongation and flexural modulus, and in general, possess improvement in one or more of such properties over the similar properties for the polymeric substrate starting material.

The following examples illustrate ways in which the principle of the invention has been applied, but are not to be construed as limiting its scope.

Example 1

Polyethylene in the form of a fine powder of particles smaller than 100 microns and having a melt index of 5 was irradiated in air by passing the polymer through a beam of high speed electrons from a Van de Graaff accelerator operating at a beam current of 220 microamperes and 2 mev. potential at a dose rate of 0.4 megarad per pass for a total dose of 1.2 megarads. The irradiated polyethylene was fed to a plastics extruder wherein it was pressed and heated to a molten condition at a temperature of about 180° C. and was mixed with acrylic acid, fed under pressure to a mid-section of the barrel of the plastics extruder, in proportions corresponding to 90 parts by weight of the irradiated polyethylene and 10 parts by weight of the acrylic acid. The resulting mixture was malaxated under pressure at heat-plastifying temperatures for a period of about four minutes then was extruded into the atmosphere and was cooled to room temperature and was cut to a granular form. The product was analyzed and was found to contain 9.6 percent by weight of chemically combined acrylic acid. A weighed portion of the product was dissolved in xylene. To the cooled xylene polymer mixture was added 5 parts methanol per 1 part xylene. The precipitate was separated by filtering and was dried. The loss in weight is a measure of the amount of homopolymer formed in the reaction. Eighty-one percent by weight of the acrylic acid in the product was chemically combined as graft copolymer. A weighed portion of the product was extracted with hot xylene in a Soxhlet extractor. The product was found to consist of less than 0.1 percent by weight of xylene insoluble material.

In contrast when polyethylene and acrylic acid containing 0.5 percent by weight of dicumyl peroxide were blended together under similar conditions, the product was found to contain 9.6 percent by weight of chemically combined acrylic acid and 16 percent by weight of xylene insoluble material. The xylene insoluble material consisted of 56 percent by weight of chemically combined acrylic acid.

*Example 2*

The product comprising the graft copolymer prepared from the irradiated polyethylene and the acrylic acid in Example 1, was fed to a 1.5 inch diameter screw type plastics extruder wherein it was pressed and heated to a heat-plastified flowable condition, then was extruded through a slot-type orifice having the dimensions 13 inches wide by 0.01 inch thick as a sheet that was oriented by stretching in a longitudinal direction by take-up rolls and was wound onto a roll as a film 0.2 mil thick. The film was found to have a burst strength of 13.6 pounds per square inch and a yield strength of 2400 pounds per square inch.

*Example 3*

Portions of the film of the graft copolymer prepared in Example 2 was laminated onto aluminum foil by pressing and heating the same at a temperature of 170° C. under pressure of 100 pounds per square inch gauge pressure for a period of one minute. Attempts to peel the film from the aluminum foil resulted in breaking of the film. After heating of a test piece of the laminate in boiling water for a period of 30 minutes, the film could not be peeled from the aluminum foil.

*Example 4*

A graft copolymer of polyethylene and acrylic acid was prepared by procedure similar to that employed in Example 1, except that the polyethylene was irradiated with a beam of high speed electrons from a Van de Graaff accelerator at 0.5 megarad per pass and for a total dose of 2 megarads, and the irradiated polyethylene and acrylic acid were fed to the plastics extruder in proportions of 86 parts by weight of the irradiated polyethylene and 14 parts of the acrylic acid. The product contained 13.2 percent by weight of chemically combined acrylic acid, and contained less than 0.1 percent by weight of xylene insoluble material. Sixty-five percent of the acrylic acid in the product was chemically combined as graft copolymer.

In a similar experiment, except that the polyethylene was irradiated with a beam of high speed electrons at a dose rate of 2 megarads per pass for a total dose of 6 megarads, and the irradiated polyethylene and acrylic acid were fed to the plastics extruder at rates of 88 parts of the irradiated polyethylene and 12 parts of the acrylic acid per 100 parts by weight of said ingredients, the product was found to contain 11.2 percent by weight of chemically combined acrylic acid and less than 0.1 percent by weight of xylene insoluble material. Seventy-five percent of the acrylic acid in the product was chemically combined as graft copolymer.

*Example 5*

Polyethylene in the form of a fine powder of particles of sizes between about 1 and 100 microns and having a melt index of 4.5 was irradiated in air at room temperature by passing the polymer through a beam of high speed electrons from a Van de Graaff accelerator operating at a beam current of 2 microamperes and 2 mev. potential at a dose rate of 0.4 magarad per pass for a total dose of 2 megarads. The irradiated polymer had a melt viscosity of 3. The irradiated polymer together with acrylic acid was fed to a Welding Engineering twin-screw plastics extruder in proportions of 90 parts by weight of the irradiated polyethylene and 10 parts of the acrylic acid. The mixture was compounded and malaxated under pressure and at temperatures between 155° C. and 210° C. in the plastics extruder for a period of 2 minutes, then was extruded into the atmosphere and was cooled and cut to a granular form. The product was analyzed and was found to consist of 7.6 percent by weight of acrylic acid in chemically combined form. Eighty-five percent of the acrylic acid was chemically combined as graft copolymer. The product had a melt index of 3.6.

*Example 6*

The experiment of Example 5 was repeated, except that the polyethylene was pre-irradiated in air for a total dose of 0.4 megarad, and the pre-irradiated polymer and acrylic acid were fed to the extruder in proportions of 88 parts of polymer and 12 parts of acrylic acid. The product contained 6.7 percent by weight of chemically combined acrylic acid. Fifty-five percent of the acrylic acid was chemically combined as graft copolymer.

I claim:
1. A method for making a graft copolymer which comprises malaxating at heat-plastifying temperatures between 130° and 250° C., a normally solid resinous thermoplastic polymer selected from the group consisting of (a) homopolymers of aliphatic olefins containing from 2 to 3 carbon atoms in the molecule and (b) copolymers of said olefins, which polymer has been irradiated with high energy ionizing radiation in an oxygen containing atmosphere while in the form of fine particles not greater than 1000 microns and in a field having an intensity of at least 10,000 rads per hour for a dose of from 0.1 to 10 megarads, while contacting the heat-softened polymer with a monomer selected from the group consisting of acrylic acid and methacrylic acid.

2. A method for making a graft copolymer which comprises malaxating at heat-plastifying temperatures between 130° and 250° C., a normally solid resinous thermoplastic polymer selected from the group consisting of homopolymers of aliphatic olefins containing from 2 to 3 carbon atoms in the molecule and copolymers of said olefins, which polymer has been irradiated with high energy ionizing radiation in an oxygen containing atmosphere while in the form of fine particles not greater than 1000 microns and in a field having an intensity of at least 10,000 rads per hour for a dose of from 0.1 to 10 megarads, while contacting the heat-softened polymer with a monomer selected from the group consisting of acrylic acid and methacrylic acid, for a time sufficient to polymerize at least a predominant amount of said monomer.

3. A method according to claim 2, wherein the polymer is polyethylene.

4. A method according to claim 2, wherein the monomer is acrylic acid.

5. A method for making a graft copolymer which comprises malaxating at heat-plastifying temperatures between 130° and 250° C., polyethylene that has been irradiated with high energy ionizing radiation in an oxygen containing atmosphere while in the form of fine particles not greater than 1000 microns and in a field having an intensity of at least 10,000 rads per hour for a dose of from 0.1 to 10 megarads, while contacting the heat-softened polyethylene with acrylic acid.

6. A graft copolymer obtained by the method of claim 1.

7. A graft copolymer obtained by the method of claim 2.

8. A graft copolymer obtained by the method of claim 5.

References Cited by the Examiner

UNITED STATES PATENTS

| 2,991,269 | 4/1961 | Nozaki | 260—878 |
| 3,088,791 | 5/1963 | Cline et al. | 204—154 |
| 3,102,050 | 8/1963 | Canterino et al. | 260—878 |
| 3,137,674 | 6/1964 | Marans et al. | 260—878 |
| 3,177,269 | 4/1965 | Nowak et al. | 260—878 |

MURRAY TILLMAN, *Primary Examiner.*

WILBUR L. BASCOMB, JR., *Examiner.*